(12) United States Patent
Filizola et al.

(10) Patent No.: US 7,333,816 B2
(45) Date of Patent: Feb. 19, 2008

(54) SYSTEM AND METHOD FOR IDENTIFYING THE POSITION OF MOBILE TERMINALS

(75) Inventors: Davide Filizola, Turin (IT); Luciano Ordano, Turin (IT); Loris Stola, Turin (IT)

(73) Assignee: Telecom Italia S.p.A., Milan (IT)

( * ) Notice: Subject to any disclaimer, the term of this patent is extended or adjusted under 35 U.S.C. 154(b) by 446 days.

(21) Appl. No.: 10/432,831

(22) PCT Filed: Nov. 16, 2001

(86) PCT No.: PCT/IT01/00575

§ 371 (c)(1),
(2), (4) Date: Jun. 24, 2003

(87) PCT Pub. No.: WO02/43428

PCT Pub. Date: May 30, 2002

(65) Prior Publication Data

US 2004/0058691 A1 Mar. 25, 2004

(30) Foreign Application Priority Data

Nov. 24, 2000 (IT) .......................... TO2000A1097

(51) Int. Cl.
*H04Q 7/20* (2006.01)

(52) U.S. Cl. .............................. 455/456.1; 455/414.2; 455/440; 455/455; 455/456.3; 455/464

(58) Field of Classification Search ............ 455/414.2, 455/440, 455, 456.1, 456.3, 464
See application file for complete search history.

(56) References Cited

U.S. PATENT DOCUMENTS

| 5,959,580 A | 9/1999 | Maloney et al. |
| 6,104,344 A | 8/2000 | Wax et al. |
| 6,269,246 B1 * | 7/2001 | Rao et al. ................. 455/456.3 |
| 6,393,294 B1 * | 5/2002 | Perez-Breva et al. .... 455/456.5 |

FOREIGN PATENT DOCUMENTS

| CA | 2 235 982 | 12/1998 |
| EP | 0 982 964 | 3/2000 |
| WO | WO 00/18148 | 3/2000 |
| WO | WO 01/28272 | 4/2001 |

* cited by examiner

*Primary Examiner*—Nay Maung
*Assistant Examiner*—Janelle N. Young
(74) *Attorney, Agent, or Firm*—Andrew Wilford

(57) ABSTRACT

The present invention relates to a system 10 and method for identifying the position of cellular telephones 12 in a geographical area served by a mobile telephony network 14. The system 10 comprises a mobile location center 15 capable of analyzing information about the electromagnetic (RF) field transmitted by cellular telephones 12 with reference information including both RF information and probabilistic information associated with the morphology of the geographical area. The method involves assigning different weights to the location of cellular telephones 12 as a function of probabilistic reference information, and thus makes it possible to use statistical methods for resolving situations of ambiguity in locating cellular telephones which would otherwise be resolved in purely random fashion.

7 Claims, 1 Drawing Sheet

SYSTEM AND METHOD FOR IDENTIFYING THE POSITION OF MOBILE TERMINALS

FIELD OF THE INVENTION

The present invention relates to a system and method for identifying the position of mobile terminals or cellular telephones.

More particularly, the present invention relates to a system and method for identifying the position of a cellular telephone in a geographical area served by a mobile telephony network.

BACKGROUND OF THE INVENTION

Systems and methods for identifying the position of cellular telephones are known in the prior art.

For example, International Patent Publication No. WO0018148 describes a method for locating cellular telephones.

The prior art method makes it possible to locate cellular telephones by comparing the Radio Frequency information collected from the cellular telephone (cellular telephone's RF fingerprint or RF measurements) with RF information contained in a reference database (reference RF fingerprint), in which each reference RF fingerprint corresponds on a one-to-one basis with an elementary area or pixel of the geographical area served by the network, and by assigning the cellular telephone to the position corresponding to the reference RF fingerprint whose values are closest to those of the cellular telephone.

While the prior art method would appear to provide reliable results from the technical standpoint, from the practical standpoint the results that this method furnishes are in general unreliable or inaccurate at best.

One practical problem is associated with the limited number of frequency channels (channels) that cellular telephones use in order to communicate.

As the number of channels is limited (In Italy, for example, GSM (Global System for Mobile Communications) networks provide 124 channels, only a portion of which are allocated to each operator, it is usual for an operator to assign identical channels to radio base stations that "cover" a given geographical area.

Because of this practice, which is also called frequency reuse, the cellular phone receives RF signals for each channel which correspond to the algebraic sum, in terms of power, of the field values received from the respective radio base stations using the same channel. Consequently, the cellular telephone's RF fingerprint for a given channel may be the same even when it is generated in different parts of the geographical area, given that it derives from a sum. As can readily be understood, this problem would not exist if the channels were not reused. In such a case, in fact, the field value for each channel would depend only on electromagnetic loss factors due to the route taken to reach the cellular telephone.

Another practical problem springs from the fact that the cellular telephones generate an RF fingerprint which includes the field values of a limited number of channels. In the case of GSM, for example, the cellular telephones are capable of generating an RF fingerprint that includes a maximum of seven values (value septuplet), each corresponding to a field RF value for a different channel.

Consequently, it is extremely probable in practice that cellular telephones positioned at different elements or pixels in the geographical area generate identical septuplets, precisely because of the limited number of values that can be used. Naturally, when the cellular telephones can provide a number of values equal to the number of available channels, the potential for error would be very limited.

A third technical problem is associated with the fact that the reference databases, even if updated regularly, contain field values which, regardless of the method used to obtain them, cannot correspond exactly to the cellular telephones' field values because of the continual variations in environmental and/or weather conditions which determine the latter values.

For this reason, it cannot be realistically assumed in practice that the cellular telephone's position is uniquely identified by a single reference fingerprint, except in particularly fortunate circumstances.

Essentially, then, though the prior art method may be accurate in theory, it has been found in practice that this method results in location errors which in many cases may be significant because of frequency reuse, the limited number of values that the cellular telephone uses to generate the RF fingerprint, and the fact that the values measured by the cellular telephone vary over time.

In GSM networks, for example, it has been determined experimentally that there is a systematical ambiguity in establishing cellular telephone location because the prior art method assigns the same septuplet to points that are geographically quite distant, and may be up to several kilometers apart.

DISCLOSURE OF THE INVENTION

The object of the present invention is a system and method for identifying the position of cellular telephones which does not have the drawbacks of the prior art method, even though it does not require that the characteristics of the cellular telephones and the information they generate in order to permit location be modified.

This object is achieved by the cellular telephone location system and method as described in the independent claims.

In particular, in accordance with the present invention, location ambiguity can be reduced by introducing additional probabilistic information to the reference database in order to assign cellular telephone location statistically.

BRIEF DESCRIPTION OF THE DRAWINGS

The above and other features of the present invention will be better understood from the following description of a preferred embodiment of the invention, which is intended purely by way of an example and is not to be construed as limiting, taken in conjunction with the accompanying drawings, where.

DESCRIPTION OF A PREFERRED EMBODIMENT OF THE INVENTION

Figure 1:
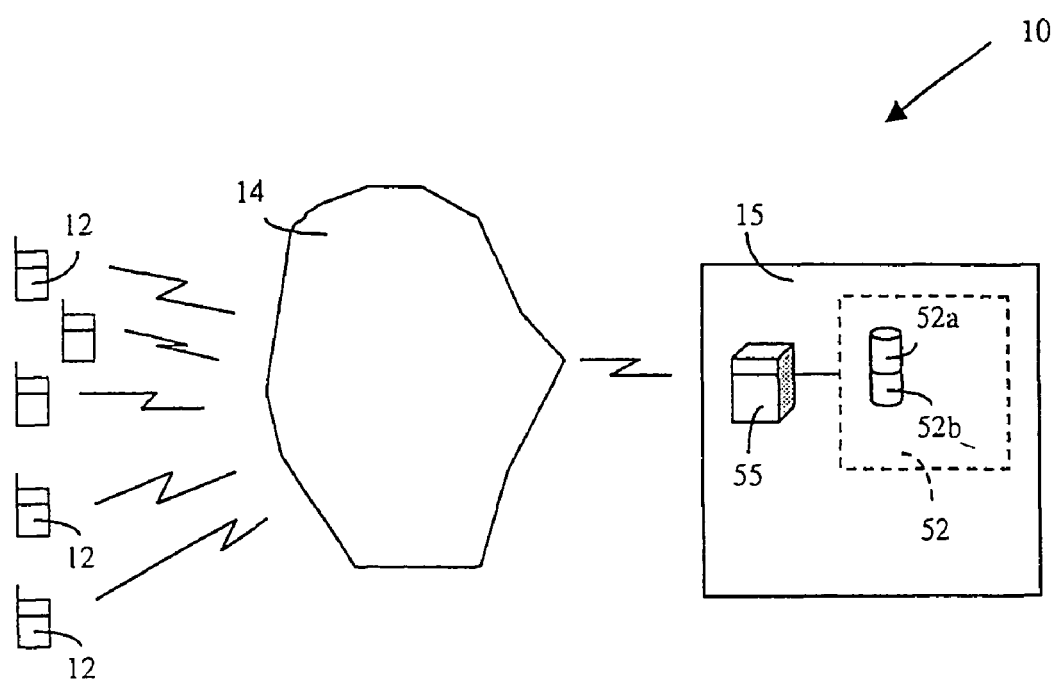
FIG. 1 represents a block diagram of the system in accordance with the invention.

With reference to FIG. 1, the location system 10 in accordance with the present invention comprises a multiplicity of mobile terminals 12, e.g., cellular telephones, randomly distributed over a given geographical area and whose position is to be identified, a mobile telephony or cellular network (network) 14, e.g., a GSM network, and a Mobile Location Center (MLC center) 15.

Figure 2:
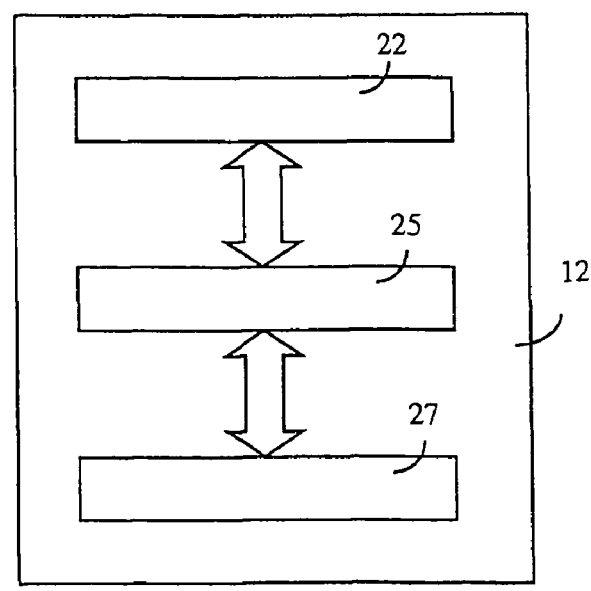
FIG. 2 represents a logic diagram of the cellular telephones as shown in FIG. 1.

Each cellular telephone 12 (FIG. 1 and FIG. 2) is of known type and comprises a radio frequency circuit (RF circuit) 22, a control circuit 25 connected to the RF circuit 22 and capable of controlling the activities of the cellular telephone 12 on the basis of programs stored in the control circuit 25, and a SIM card (SIM) 27, connected in accordance with the prior art to the control circuit 25.

The SIM card 27, of known type, comprises programs which are appropriately prepared by a telephone operator, for example, to manage and bill telephone traffic or, as will be described in detail below, to enable the cellular telephone 12 to be located.

The control circuit 25, as is known, is capable in particular of measuring, periodically and by means of the RF circuit 22, electromagnetic field values (RF measurements) in a given number of frequency channels (channels), and of selecting among these channels a maximum number of RF measurements, e.g., up to 7 for GSM networks, corresponding to an equal number of channels for which the cellular telephone 12 is capable of decoding an associated identification code.

In accordance with the present invention, the SIM card 27 is capable in particular of responding to appropriate commands set up by the telephone operator and activated by the cellular telephone user by causing the control circuit 25 to perform a predetermined number of measurements, transferring the measurements to the SIM card, and transmitting them in the form, for example, of SMS short messages.

The network 14, of known type, e.g. the GSM network, is capable of receiving the RF measurements transmitted by the cellular telephones 12 and of transmitting them to the MLC center 15.

In general, the network 14 comprises a multiplicity of radio base stations (RB stations) which are not shown in the figure, and is capable of permitting the exchange of messages and communications between cellular telephones 12 present in elementary points or pixels of the geographical area and service centers, systems and equipment connected to the network 14 and, for example, the MLC center 15.

The MLC center 15 comprises a computer 55 of known type, for example a dual CPU Pentium® III computer with 512 Mbytes RAM and Windows® NT operating system, and a disk sub-system (disks) 52 of known type, connected to computer 55 and capable of storing reference databases in a first memory zone 52a, and modules or programs to be used in identifying the position of cellular telephones 12 in a second memory zone 52b.

As will be described in detail below, the MLC center 15 is capable of running the programs stored in zone 52b and of identifying, by means of these programs and on the basis of the SMS messages received from cellular telephone 12 and of the reference databases stored in zone 52a, the position of the cellular telephones and of transmitting the position information so obtained to service centers and/or to the cellular telephones 12 by means of the network 14.

In accordance with a characteristic feature of the present invention, the reference database comprises a multiplicity of information strings (records), each consisting of information or fields having the meaning shown in Table 1 below:

TABLE 1

| INFORMATION OR FIELDS | | |
|---|---|---|
| I | II to (N-1) | No. |
| Identifier for geographical area pixel | RF field values for the channels allocated to the telephone operator who manages the MLC center and which | Probability $\rho_p$ that the cellular telephone is |

TABLE 1-continued

| INFORMATION OR FIELDS | | |
|---|---|---|
| I | II to (N-1) | No. |
| $p_i$. | identify the pixel through a one-to-one correspondence. | located in the pixel. |

In particular, the number of information items relating to RF field values correspond, for example, to the number of frequency channels allocated to the telephone operator and is larger than the number of channels that cellular telephone 12 is capable of decoding.

In addition, the probability or factor $\rho_p$ that the cellular telephone is located in pixel $p_i$ or traffic probability $\rho_p$ is determined on a pixel-by-pixel basis using cartographic information such as the following:

Morphological classification of the pixel;
buildings Percentage on the pixel;
Presence of communication infrastructures such as roads, highways,
railroads, etc.

In accordance with this example of a preferred embodiment of the invention, the altitude above sea level of each pixel was not regarded as contributing to determining factor $\rho_p$ more reliably, and was thus not considered as an active element in defining this parameter.

To facilitate the normalization operation without limiting the extent to which the formal approach taken to the problem is generally applicable, a range of values from 0 to 1 was assumed for factor $\rho_p$, where the traffic that can be expected for pixel $p_i$ increases as $\rho_p$ increases.

In accordance with this example of a preferred embodiment of the invention, it is assumed that a finite number of levels (i.e., a total of 10) will be used for $\rho_p$. The method used to assign these levels as a function of geographical characteristics is presented in the diagram shown in Table 2 below.

As will be readily apparent to a person skilled in the art, the definition of the values assumed by parameter $\rho_p$ depends on geographical characteristics in accordance with relationships which, in certain cases, combine various attributes through logical "or" and/or "and" operations. For example, the condition for the first level ($\rho_p$=0.1) is, first of all, that the corresponding pixel is covered by a buildings percentage equal to 2% and ("and") that one of the following three ("or") conditions be satisfied: bare area, glacier, dense forest, and ("and"), secondly, that there must be no communication infrastructures (no main road and no major highway).

It is clear on the whole that a pixel which satisfies these conditions is intuitively at the bottom of the scale of potential traffic values. Likewise, it should be borne in mind that the intrinsic numerical value of 0.1 is to be understood as relative to the overall range (0 to 1) and not as an absolute value, for which no assumptions are made in the absence of specific information.

Thus, the other values of $\rho_p$ are defined by a unique assignment mechanism which is readily implemented starting From the geographical information available to a person skilled in the art.

Obviously, the diagram in Table 2 derives from a reasonable series of assumptions, which are also dictated by considerations that can be verified experimentally through analyses of samples of the geographical area, and are intended to establish the average number of people occupying the area and the composition/activities of this population.

TABLE 2
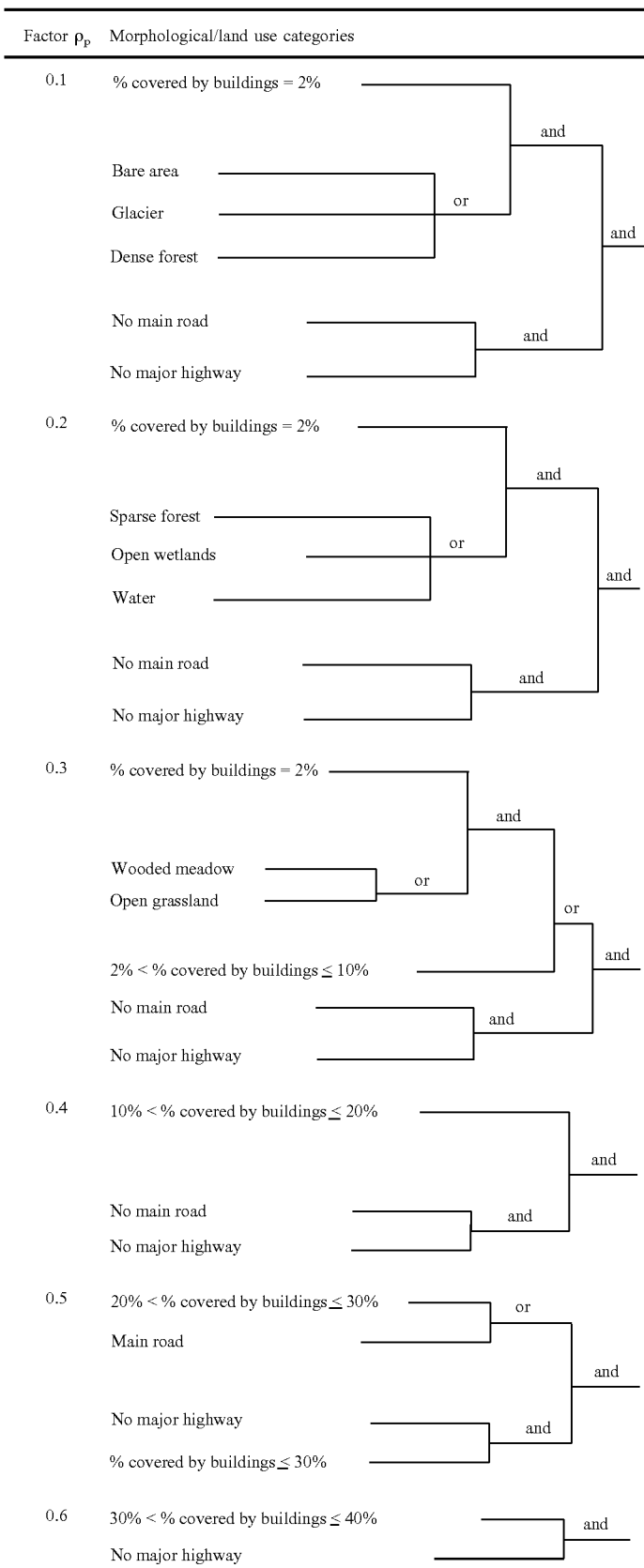

TABLE 2-continued

| Factor $\rho_p$ | Morphological/land use categories |
|---|---|
| 0.7 | 40% < % covered by buildings ≤ 50% — and<br>No major highway |
| 0.8 | 50% < % covered by buildings ≤ 60% — or<br>Major highway<br>and<br>% covered by buildings ≤ 60% |
| 0.9 | 60% < % covered by buildings ≤ 70% |
| 1 | % covered by buildings > 70% |

As will be readily apparent to a person skilled in the art, the number of discrete values that can be assigned to $\rho_p$ and the techniques used to define these values can be varied at will without departing from the general criteria of quantizing the probability of traffic for the various pixels in the geographical areas as a function of cartographic parameters.

In accordance with the method contemplated by the present invention, operation of the system 10 described above is as follows.

When the user of the cellular telephone 12 activates the location function, the SIM card 27 causes the control circuit 25 to activate one or more measurements in sequence of the electromagnetic field in the channels available to cellular telephone 12 by means of the RF circuit 22.

The RF measurements are transferred by the control circuit 25 to the SIM card 27 which, on the basis of the programs stored in its internal memory, causes the control circuit 25 to transmit these measurements to the MLC center 15.

The RF measurements thus transmitted relate, e.g., for the GSM standard, to a maximum of 7 field values for 7 channels.

By means of computer 55 and the programs and data stored in disks 52, the MLC center 25 compares the received field values with the field values of the respective channels stored in the records of the reference database using a predetermined tolerance.

If the outcome of this comparison is negative, or in other words if no record and corresponding pixel are found in the reference database, the computer 55 modifies the search tolerance in discrete steps in order to identify at least one record corresponding to the received RF measurements in the reference database.

If comparison makes it possible to identify a single record, the search ends and the MLC center 25, by means of the computer 55 and network 14, transmits the location information to the cellular telephone and/or to the service center set up to support queries associated with location.

If, as in fact invariably occurs in practice, the comparison identifies a plurality of records, and hence of candidate pixels for establishing the cellular telephone's location, the computer 55 takes the $\rho_p$ factors from the records thus identified, assigns a weight proportional to the identified values to these factors, and calculates the position of the cellular telephone by means of a statistical procedure using the weighted $\rho_p$ factors, so that the higher the value of $\rho_p$, the higher the probability of assigning the position to the corresponding pixel will be.

In detail, a real range, (1,100) for example, is defined. For this range, it is assumed that a random number generator with a uniform probability density is available. Thus, in the presence of, say, two records, the first with $\rho_{p=1}$=0.8 and the second with $\rho_{p=2}$=0.2, the first pixel will be associated with a sub-range R1 of amplitude (1,80), while the second pixel is associated with a sub-range R2 of amplitude (81,100). Extracting a random number from range R with the aforesaid generator makes it possible to assign the cellular telephone's position to one of the two pixels with a probability equal to the respective $\rho_p$ factors.

In cases of ambiguity, the computer 55 transmits, for example, the information regarding the cellular telephone's position and information regarding possible alternative positions and the corresponding probabilities to the service center.

Through the proposed method, it is thus possible to manage situations of ambiguity in weighted fashion, avoiding the problem which is frequently encountered in practice of having to assign a position at random to the cellular telephone in cases of ambiguity, without taking probabilistic factors associated with the geographical area's cartographic parameters into account.

As it has been found in practice that the number of possible positions which can be assigned to the cellular telephone in very large geographical areas such as an Italian region, for example, is in the order of several hundreds, it is also proposed in accordance with a variant to the present invention that the reference database include a further field or information associated with each pixel $p_i$ in the geographical area, viz., the identifier of the RB station which is enabled to exchange information with the cellular telephones positioned in said pixels.

In accordance with this variant, the SMS message transmitted by the cellular telephone includes the RB station identifier as well as the field values. Consequently, the computer first compares the cellular telephone's RF measurements with the field values in the records having the same received RB station identifier.

Naturally, the method used to assign a position to the cellular telephone by means of weighted probabilities $\rho_p$ remains unchanged in the proposed variant.

Though the foregoing description of a preferred embodiment of the invention applies to a GSM network, it will be readily apparent to a person skilled in the art that the method of assigning a probabilistic weight to the pixels in the geographical area can also be extended to different types of network where ambiguity in identifying the position of cellular telephones can arise when only electromagnetic field measurements are used.

The circuitry and connections contemplated in the foregoing description are capable of modifications in various obvious respects, as are the details of the operating method as illustrated, all without departing from the scope of the invention.

The invention claimed is:

1. A system for identifying the position of a mobile terminal in a geographic area defined by a multiplicity of pixels and served by a wireless telecommunications network having a plurality of radio base stations, the system comprising:

the mobile terminal having
means for capturing a mobile-terminal fingerprint including field values corresponding to a first number of channels in the RF spectrum; and
means for transmitting the mobile-terminal fingerprint;

at least one reference station having
means for capturing the mobile-terminal fingerprint and comparing it with a plurality of reference fingerprints each corresponding to a position of the respective mobile terminal in the network, the reference fingerprints each in turn comprising
a) a field value corresponding to a second number of channels in the RF spectrum, the first number being a subset of the second number; and
b) a respective probabilistic value associated with each pixel of the area and indicative of the probability that the mobile terminal is located in the respective pixel of the geographic area and associated with cartographic information for the geographic area representative of a mobile-terminal traffic probability for the respective pixel;
means for selecting a predetermined number of candidate fingerprints from the plurality of reference fingerprints on the basis of the comparison between the plurality of reference fingerprints and the mobile-terminal fingerprint, the predetermined number of candidate fingerprints identifying a position of the mobile terminal in the geographic area; and
means for assigning a unique position to the mobile terminal by attributing one of the candidate fingerprints to the mobile terminal on the basis of the probabilistic value.

2. The system in accordance with claim 1 wherein the mobile-terminal fingerprint and the reference fingerprints also comprise:
c) identifying codes for identifying a radio base station capable of exchanging information with the mobile terminal in the geographic area.

3. The system in accordance with claim 1 wherein the reference station comprises
means for transmitting the position assigned to the mobile terminal to service centers connected to the network.

4. The system in accordance with claim 1 wherein the wireless telecommunication network is a GSM network.

5. A method for identifying the position of a mobile terminal in a geographic area comprised of a multiplicity of pixels and served by a wireless telecommunications network, the method comprising the steps of:

capturing with the mobile terminal a mobile-terminal fingerprint including field values corresponding to a first number of channels in the RF spectrum;

comparing the mobile-terminal fingerprint with a plurality of reference fingerprints each corresponding to a position in the network and each comprising
a) a field value corresponding to a second number of channels in the RF spectrum, the first number being a subset of the second number; and
b) a probabilistic value indicative of the probability that the mobile terminal is located in a respective pixel and associated with cartographic information for the geographic area representing of a mobile-terminal probability for the respective pixel;

selecting a predetermined number of candidate fingerprints from the plurality of reference fingerprints and on the basis of the comparison between the plurality of reference fingerprints and the mobile-terminal fingerprint identifying a possible position of the mobile terminal in the geographic area; and assigning a unique position to the mobile terminal by attributing one of the candidate fingerprints to the mobile terminal on the basis of the probabilistic value.

6. The method in accordance with claim 5 wherein the mobile-terminal fingerprint and the reference fingerprints also comprise:
c) identifying codes for identifying a radio base station capable of exchanging information with the mobile terminal in the geographic area.

7. The method in accordance with claim 5, further comprising the step of:
transmitting the unique position assigned to the mobile terminal to service centers connected to the network.

* * * * *